US012044127B1

(12) United States Patent
Johnson

(10) Patent No.: US 12,044,127 B1
(45) Date of Patent: Jul. 23, 2024

(54) BELT LINE INSTALLATION DEVICE

(71) Applicant: Terry Johnson, Esterhazy (CA)

(72) Inventor: Terry Johnson, Esterhazy (CA)

(73) Assignee: 101219508 Sa katchewan Ltd., Esterhazy (CA)

( * ) Notice: Subject to any disclaimer, the term of this patent is extended or adjusted under 35 U.S.C. 154(b) by 279 days.

(21) Appl. No.: 17/482,663

(22) Filed: Sep. 23, 2021

(51) Int. Cl.

| | |
|---|---|
| ***E21F 13/08*** | (2006.01) |
| ***E21F 13/02*** | (2006.01) |
| ***E21F 13/06*** | (2006.01) |
| *B66F 9/065* | (2006.01) |

(52) U.S. Cl.
CPC ............ *E21F 13/02* (2013.01); *E21F 13/063* (2013.01); *E21F 13/08* (2013.01); *B66F 9/0655* (2013.01)

(58) Field of Classification Search
CPC ......... E21F 13/02; E21F 13/063; E21F 13/08; E21F 13/00; E21F 13/083; B66F 9/0655
See application file for complete search history.

(56) References Cited

U.S. PATENT DOCUMENTS

| | | | | |
|---|---|---|---|---|
| 3,587,893 A * | 6/1971 | Laken | B66F 9/061 | 414/640 |
| 3,920,115 A | 11/1975 | Craggs | | |
| 4,896,764 A | 1/1990 | Neunzert | | |
| 5,898,378 A * | 4/1999 | Berg | B66F 9/187 | 414/607 |
| 6,095,320 A | 8/2000 | DeMong et al. | | |
| 6,758,326 B1 | 7/2004 | Benjamin | | |
| 7,980,806 B1 | 7/2011 | Conner et al. | | |
| 8,985,703 B2 | 3/2015 | Zimmerman | | |
| 9,452,887 B2 | 9/2016 | Gordon | | |
| 2004/0208736 A1* | 10/2004 | Mensch | B66F 9/065 | 414/685 |
| 2007/0065265 A1* | 3/2007 | Benson | B21C 47/242 | 414/622 |
| 2011/0226556 A1* | 9/2011 | Balcom | B66F 9/12 | 29/428 |
| 2012/0119530 A1* | 5/2012 | Lauvdal | B66F 9/195 | 294/188 |
| 2014/0262627 A1* | 9/2014 | Balcom | B66F 9/18 | 187/237 |
| 2017/0297473 A1* | 10/2017 | Baareman | B65H 75/4492 | |
| 2019/0144246 A1* | 5/2019 | Kaytes | B66F 9/0655 | 248/122.1 |
| 2021/0010461 A1* | 1/2021 | Onurlu | F03D 13/40 | |

* cited by examiner

*Primary Examiner* — Carib A Oquendo
(74) *Attorney, Agent, or Firm* — Cramer Patent & Design PLLC; Aaron R. Cramer

(57) ABSTRACT

A belt line installation device is an apparatus designed to allow for the installation of two cranes to be mounted on a common piece of framework for use in mining. The first crane connects to the device and is installed upside down and on the left side of a conveyer where it can be used to install bottom mounted hardware on the conveyor. The second crane is installed on the top center of the invention to install top mounted hardware. This second crane also assists in loading the first crane and associated bottom mounted hardware from the pallet of hardware. The device is mounted on any quick attach equipment, such as a tele-handler or skid steer. Each crane can be powered by a PTO takeoff from nearby equipment or can be powered by a 12-volt hydraulic power pack. Each crane will be provided with wireless or pendant remote controls and a dead man switch.

17 Claims, 5 Drawing Sheets

BELT LINE INSTALLATION DEVICE

RELATED APPLICATIONS

Non-applicable.

FIELD OF THE INVENTION

The present invention relates generally to an apparatus designed in the installation of belt line hardware in a mining operation.

BACKGROUND OF THE INVENTION

As anyone who performs a lot of mechanical work will attest, nothing beats having the proper tool for a job. The proper tool can save time, save money, produce a higher quality job, reduce damage to equipment, and provide for the increased safety of the worker. Each field of mechanical work has its own type of specialty tools, each performing a specialized task. One field which uses a wide variety of specialized tools and equipment is that of potash mining. As the miners need a conveyor belt line to get the potash back to a collection point.

These heavy belt lines are in constant need of repair, modification and extension. In the past, equipment and hardware has been lifted into place on these belt lines by manual labor. This is obviously strenuous and tiring. As we all know, when a working gets tired, the chances of an accident increase. Accordingly, there exists a need for a means by which manual labor on a belt line can be decreased in order to increase safety. The development of the belt line installation device fulfills this need.

SUMMARY OF THE INVENTION

To achieve the above and other objectives, the present invention provides for a frame apparatus which has a lower plate and a pair of vertical posts which are connected together by three additional vertical posts, a set of stiffener plates which have a structural rigidity and a mounting location, a back plate which has a groove having additional structural rigidity and safety, a pair of forklift channels which are disposed below the lower plate for lifting the frame apparatus, a set of crane mounting holes which are disposed on one of the upper plates and the lower plate, and a bottom frame disposed around a perimeter of the lower plate for additional structural reinforcement.

The three vertical posts may support the upper plates and the stiffener plates. The groove is a "V"-shaped groove. The pair of forklift channels may be adjacent to the back plate. The pair of forklift channels may be attached as an integral part of the bottom frame. The crane mounting holes may be disposed on the upper plates and are fixed in position while the crane mounting holes on the lower plate include a plurality of mounting locations for adjustability. A front top crane may be attached to the crane mounting holes on the lower plate via a mechanical fastener.

A side bottom crane may be attached to the crane mounting holes on the upper plates. The mechanical fastener may be selected from the group consisting of a bolt, a nut, or a rivet. Mechanical power for the front top crane and the side bottom crane may be from a plurality of hydraulic hoses which are adapted to connect to an external power source. Movement and control of the front top crane and the side bottom crane may be adapted to be controlled by a user safely standing on the floor of the mine using a controller which emits an RF signal received via the control units.

The frame apparatus may be adapted to be attached to a piece of lifting equipment. The piece of lifting equipment may be selected from the group consisting of a telehandler, a forklift, or a scoop tram. The frame apparatus may be adapted to be intended for use inside of a mine on a conveyor system during initial installation, repair, modification, or removal of the conveyor system. The conveyor system may include a channel frame which supports a plurality of upper roller components at 5 ft. intervals and supports a plurality of lower roller components at 15 ft. intervals.

The frame apparatus may be made of steel. The steel may be cut to size and welded together. The frame apparatus may include a protective finish. The protective finish is paint or plating.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
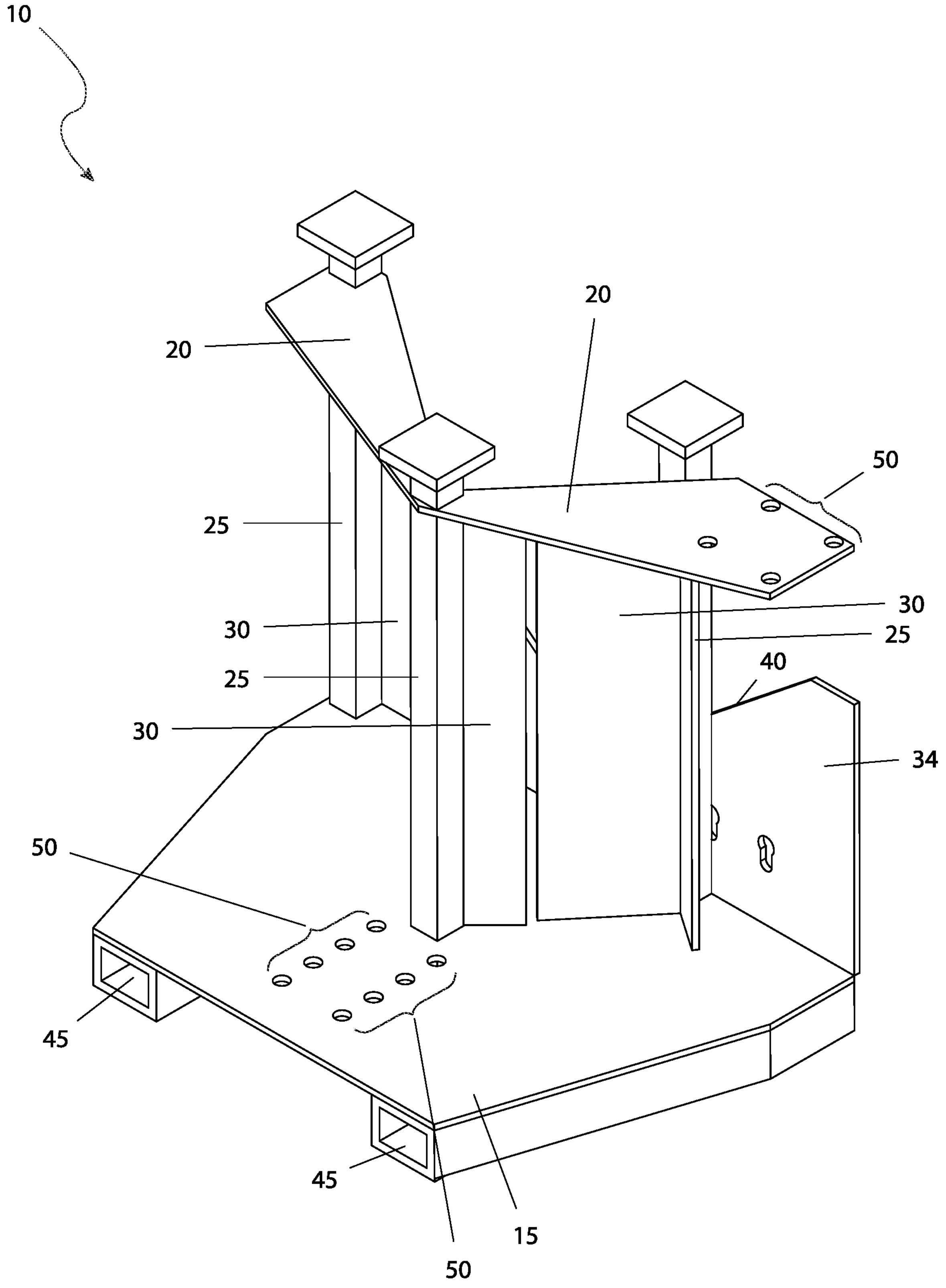
FIG. 1 is a perspective view of the frame apparatus, according to the preferred embodiment of the present invention.

10 frame apparatus
15 lower plate
20 upper plate
25 vertical post
30 stiffener plate
35 back plate
40 groove
45 forklift channel
50 crane mounting hole
55 bottom frame
60 front top crane
65 side bottom crane
70 mechanical fastener
75 control unit
80 hydraulic hose
85 lifting equipment
90 forks
95 mine
100 conveyor system
105 channel frame
110 upper roller component
115 lower roller component
120 user
125 floor
130 controller
135 RF signal
140 lifting jib Description of the Preferred Embodiments The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the frame apparatus 10, according to the preferred embodiment of the present invention is disclosed. The frame apparatus (herein also described as the "apparatus") 10, comprises a lower plate 15 and two (2) vertical posts 25 connected together by three (3) vertical posts 25. A set of stiffener plates 30 provide structural rigidity as well as a mounting location for other components of the apparatus 10. A back plate 35 with a "V"-shaped groove 40 is partially shown to provide additional structural rigidity and safety. Two (2) forklift channels 45 are provide below the lower plate 15 for purposes of lifting the apparatus 10 and its associated components. Further detail on the usage of the forklift channels 45 will be provided herein below. A set of crane mounting holes 50 are provided in one (1) of the upper plates 20 as well as the lower plate 15. It is envisioned that all components of the apparatus 10 would be made of steel stock that is cut to size and welded together. After manufacture, a suitable protective finish such as paint or plating would be applied to prevent corrosion.

Figure 2:
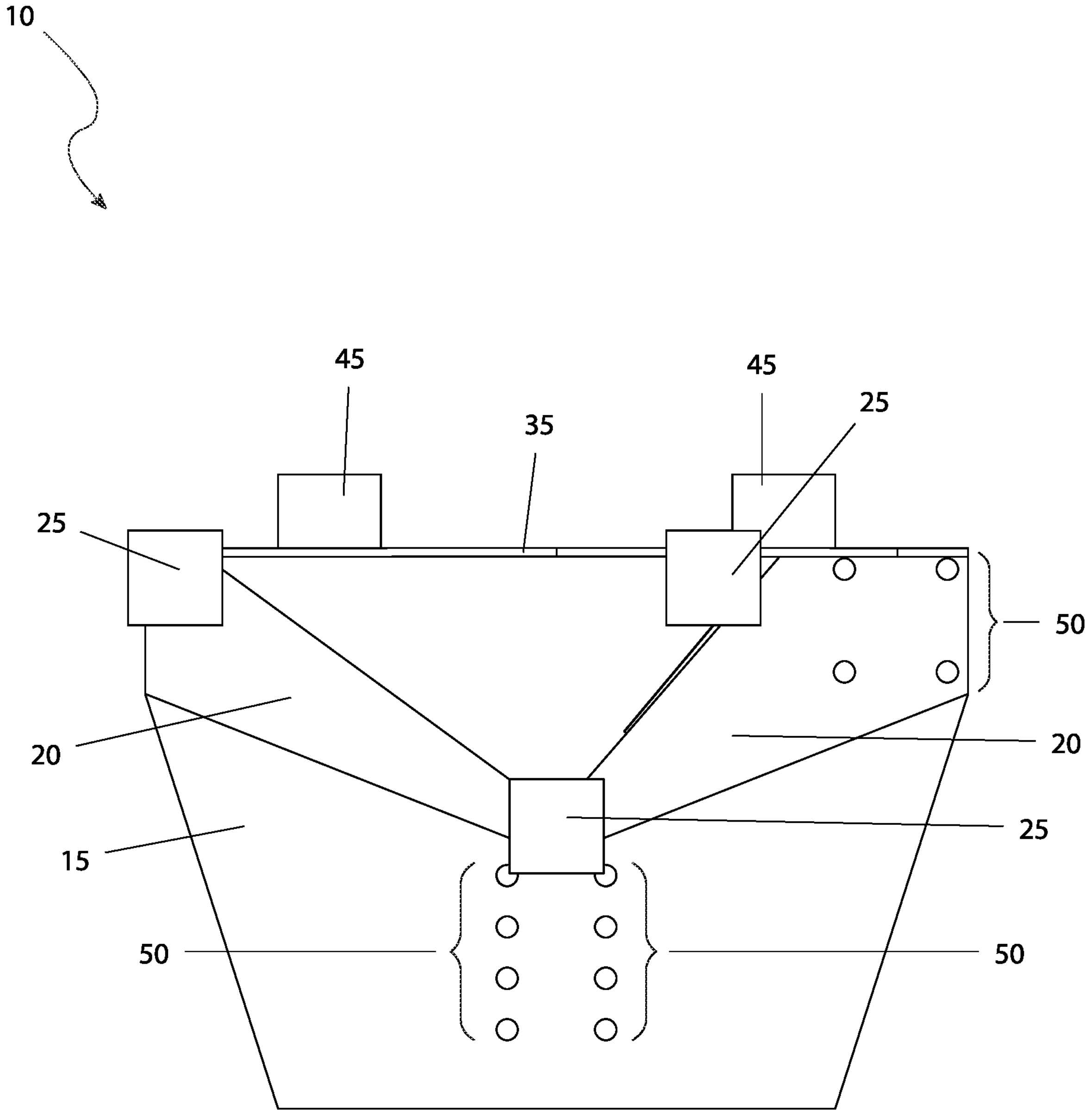
FIG. 2 is a top view of the frame apparatus, according to the preferred embodiment of the present invention.

Referring next to FIG. 2, a top view of the frame apparatus for cranes 10, according to the preferred embodiment of the present invention is depicted. This view provides further clarification on the relationship between the lower plate 15 and the upper plates 20. The three (3) vertical posts 25 support the upper plates 20 as well as the stiffener plates 30 (not shown in this view due to illustrative limitations). The forklift channels 45 are visible on the rear of the apparatus 10 adjacent to the back plate 35. The crane mounting holes 50 on the upper plates 20 is fixed in its position while the crane mounting holes 50 on the lower plate 15 provide multiple mounting locations to provide adjustability.

Figure 3:
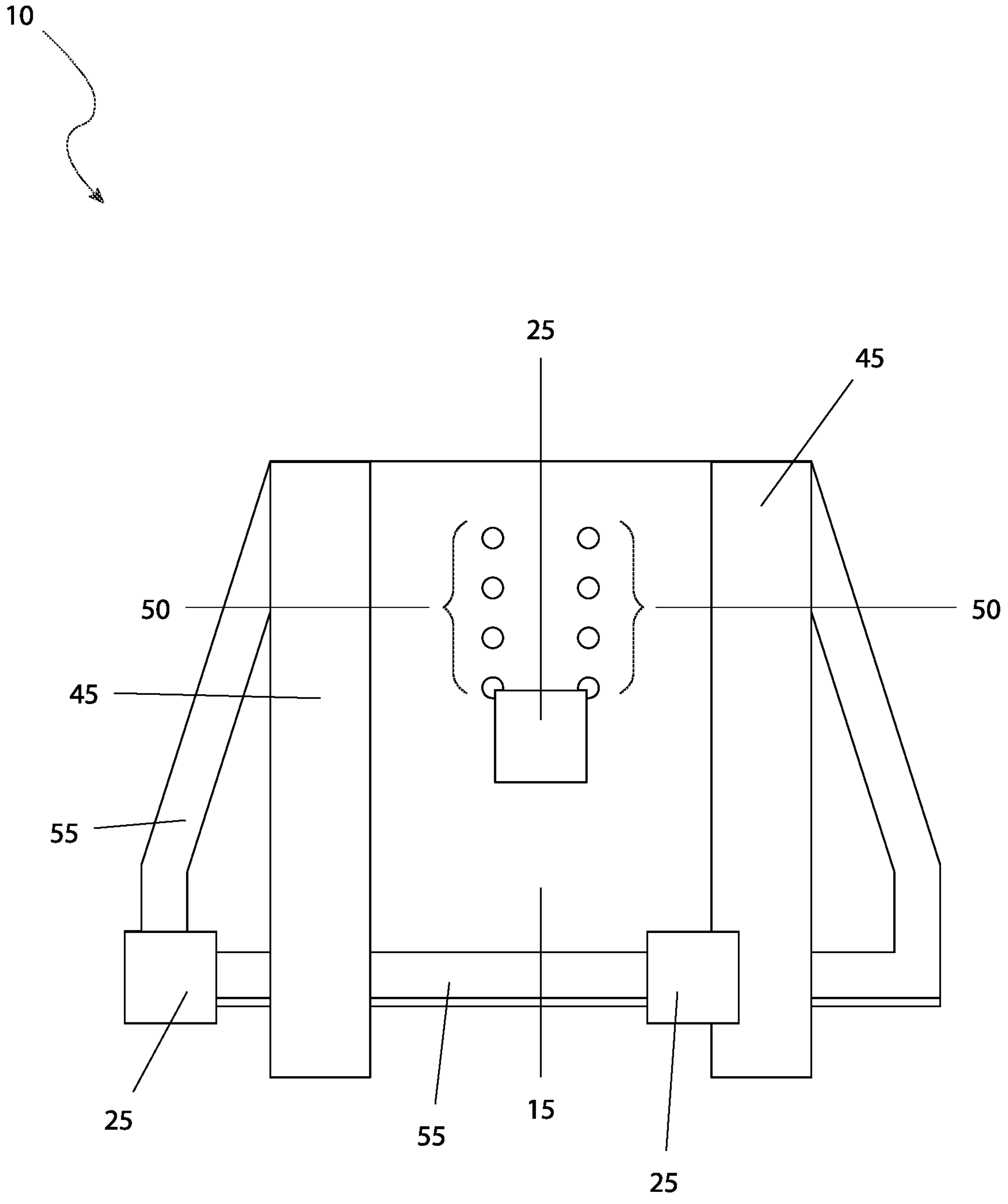
FIG. 3 is a bottom view of the frame apparatus, according to the preferred embodiment of the present invention.

Referring now to FIG. 3, a bottom view of the frame apparatus for cranes 10, according to the preferred embodiment of the present invention is shown. A bottom frame 55 is located around the perimeter of the lower plate 15 to provide additional structural reinforcement. The forklift channels 45 are attached as an integral part of the bottom frame 55. This view provides additional clarification on the vertical posts 25 which extend through the lower plate 15. Finally, the crane mounting holes 50 are visible on the bottom of the lower plate 15 due to their pass-through configuration.

Figure 4:
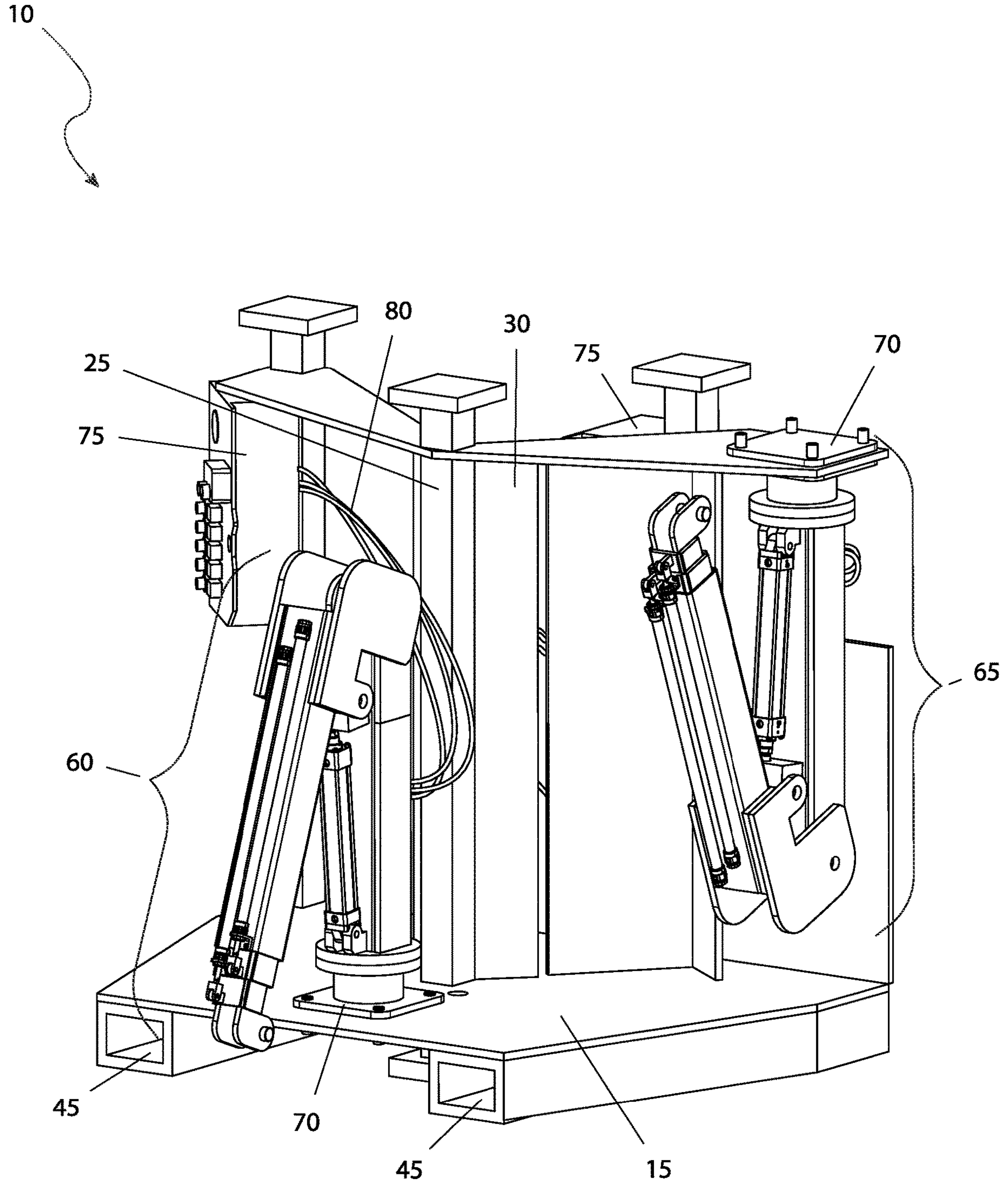
FIG. 4 is a perspective view of the frame apparatus, shown with a front top crane 60 and side bottom crane installed, according to the preferred embodiment of the present invention.

Referring next to FIG. 4, a perspective view of the apparatus 10, shown with a front top crane 60 and side bottom crane 65 installed, according to the preferred embodiment of the present invention is disclosed. The front top crane 60 is attached to the crane mounting holes 50 (not visible in this view due to illustrative limitations) on the lower plate 15, while the side bottom crane 65 is attached to the crane mounting holes 50 on the upper plates 20. Mechanical connection is made via a mechanical fastener 70 such as a bolt and nut, rivet, or the like. Various control units 75 are mounted to the stiffener plates 30, as supported by the vertical posts 25. Mechanical power for the front top crane 60 and the side bottom crane 65 are provided by hydraulic hoses 80 which connect to an external power source.

Figure 5:
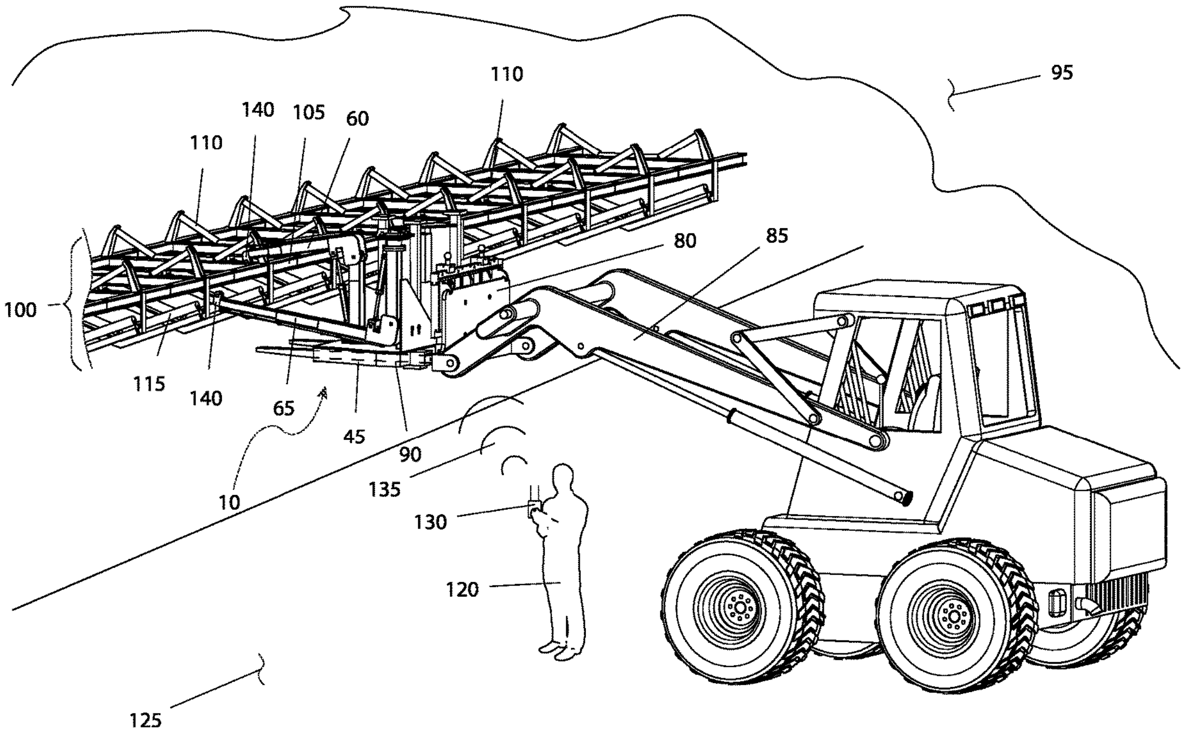
FIG. 5 is a pictorial view of the frame apparatus, shown in a utilized state, according to the preferred embodiment of the present invention.

Referring to FIG. 5, a pictorial view of the apparatus 10, shown in a utilized state, according to the preferred embodiment of the present invention is depicted. The apparatus 10 is attached to a lifting equipment 85 such as a telehandler, forklift, scoop tram, or the like. The use of the apparatus 10 with any specific type of lifting equipment 85 is not intended to be a limiting factor of the present invention. The apparatus 10 is intended for use inside of a mine 95 on a conveyor system 100 during initial installation, repair, modification, or removal of said conveyor system 100. The conveyor system 100 consists of a channel frame 105 which supports upper roller components 110 at approximately five feet (5 ft.) intervals and also supports lower roller components 115 and approximately fifteen feet (15 ft.) intervals. The hydraulic hoses 80 from the front top crane 60 and the side bottom crane 65 are connected to the power take off of the lifting equipment 85. Movement and control of the front top crane 60 and the side bottom crane 65 is controlled by a user 120 safely standing on the floor 125 of the mine 95 using a controller 130 which emits an RF signal 135. The RF signal 135 is then received via the control units 75 (as shown in FIG. 4). The front top crane 60 installs the upper roller components 110 directly. The lower roller components 115 is first picked up by the front top crane 60 which transfers the lower roller components 115 to the side bottom crane 65 which then installs the lower roller components 115 on the channel frame 105. This eliminates the need for physically lifting the upper roller components 110 and the lower roller components 115 using manual manpower. This action increases safety, while reducing physical exertion and eliminates pinch-points. Once the upper roller components 110 and the lower roller components 115 are held in place by the front top crane 60 and the side bottom crane 65, respectively, workers may secure said items in place using conventional attachment methods. The work process greatly reduces the need for workers by approximately fifty percent (50%). As work progresses along the conveyor system 100, the lifting equipment 85 moves along in a similar manner. In a normal usage configuration, the apparatus 10 is approximately three feet (3 ft.) away from the conveyor system 100. The distal end of the front top crane 60 and the side bottom crane 65 are both equipped with lifting jibs 140. The front top crane 60 has an approximate range of motion of two-hundred degrees (200°) while the side bottom crane 65 has an approximate range of one-hundred degrees (100°). As such, no workers are near the upper roller components 110 or the lower roller components 115 thus avoiding pinch points, and back strain. The reduced tendency to drop the upper roller components 110 and the lower roller components 115 prevents damage to the components as well as reducing safety risks for workers in the immediate area of work.

2. Operation of the Preferred Embodiment

The preferred embodiment of the present invention can be utilized by the common user in a simple and effortless manner with little or no training. It is envisioned that the apparatus 10 would be constructed in general accordance with FIG. 1 through FIG. 5. The user would procure the apparatus 10 from conventional procurement channels such as mining supply houses, heavy equipment manufacturers, specialty manufacturers, mail order and internet supply houses and the like.

After procurement and prior to utilization, the apparatus 10 would be prepared in the following manner: the forks 90 on a piece of lifting equipment 85 would be guided into the forklift channels 45 at the lower plate 15 on the apparatus 10. The hydraulic hoses 80 would be attached to the hydraulic power point of the lifting equipment 85 and the lifting equipment 85 driven to the point of use near the conveyor system 100 within the mine 95. At this point in time, the apparatus 10 is ready for use.

During utilization of the apparatus 10, the following procedure would be initiated: with activation of the controller 130, the user 120 operates the front top crane 60 to install upper roller components 110 on the channel frame 105; likewise, the front top crane 60 places lower roller components 115 in the lifting jibs 140 of the side bottom crane 65 to install said lower roller components 115 on the bottom of the channel frame 105. Once in place, workers secure the upper roller components 110 and lower roller components 115 in a conventional manner. The lifting equipment 85 with the contained apparatus 10 may then be moved to other points along the conveyor system 100 to perform similar work as needed.

After use of the apparatus 10, it may be left in place on the lifting equipment 85 or removed, allowing the lifting equipment 85 to return to other conventional uses.

Features of the apparatus 10 that provide an enhanced benefits when compared to conventional usage with conveyor system 100 include the following: ease of use; labor savings; adapts to different lifting equipment 85; compact design; remote controlled operation; less manpower to install, upper roller components 110 and lower roller components 115, and operation in confined spaces.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A frame apparatus, comprising:
- a lower plate and a set of three vertical posts;
- a set of stiffener plates having structural rigidity and a mounting location;
- a back plate having a groove having additional structural rigidity and safety;

- a pair of forklift channels disposed below the lower plate for lifting the frame apparatus;
- a set of crane mounting holes disposed on one of an upper plates and the lower plate; and
- a bottom frame disposed around a perimeter of the lower plate for additional structural reinforcement and,
- wherein the set of three vertical posts support the upper plates and the stiffener plates;
- wherein movement and control of the front top crane and the side bottom crane is adapted to be controlled by a user safely standing on a floor of a mine using a controller which emits an RF signal received via a control units; and,
- wherein the frame apparatus is adapted to be attached to a piece of lifting equipment.

2. The frame apparatus, according to claim 1, wherein the groove is a "V"-shaped groove.

3. The frame apparatus, according to claim 1, wherein the pair of forklift channels are adjacent to the back plate.

4. The frame apparatus, according to claim 1, wherein the pair of forklift channels are attached as an integral part of the bottom frame.

5. The frame apparatus, according to claim 1, wherein the crane mounting holes are disposed on the upper plates and are fixed in position while the crane mounting holes on the lower plate include a plurality of mounting locations for adjustability.

6. The frame apparatus, according to claim 1, wherein a front top crane is attached to the crane mounting holes on the lower plate via a mechanical fastener.

7. The frame apparatus, according to claim 6, wherein a side bottom crane is attached to the crane mounting holes on the upper plates.

8. The frame apparatus, according to claim 6, wherein the mechanical fastener is selected from the group consisting of a bolt, a nut, or a rivet.

9. The frame apparatus, according to claim 6, wherein mechanical power for the front top crane and the side bottom crane are from a plurality of hydraulic hoses which are adapted to connect to an external power source.

10. The frame apparatus, according to claim 1, wherein the piece of lifting equipment is selected from the group consisting of a telehandler, a forklift, or a scoop tram.

11. The frame apparatus, according to claim 1, wherein the frame apparatus is adapted to be intended for use inside of a mine on a conveyor system during initial installation, repair, modification, or removal of the conveyor system.

12. The frame apparatus, according to claim 11, wherein the conveyor system includes a channel frame which supports a plurality of upper roller components at 5 ft. intervals and supports a plurality of lower roller components at 15 ft. intervals.

13. The frame apparatus, according to claim 1, wherein the frame apparatus is made of steel.

14. The frame apparatus, according to claim 1, wherein the steel is cut to size and welded together.

15. The frame apparatus, according to claim 1, wherein the frame apparatus includes a protective finish.

16. The frame apparatus, according to claim 15, wherein the protective finish is paint.

17. The frame apparatus, according to claim 15, wherein the protective finish is plating.

* * * * *